United States Patent
Pinzl et al.

(10) Patent No.: US 9,109,619 B2
(45) Date of Patent: Aug. 18, 2015

(54) SCREW HAVING A SCREW HEAD, A SCREW SHANK AND A CORRUGATED CONICAL FLANGE

(75) Inventors: Wilfried Pinzl, Tambach-Dietharz (DE); Ralph J. Hellmig, Bad Laasphe (DE)

(73) Assignee: EJOT GMBH & CO. KG, Bad Berleburg (DE)

( * ) Notice: Subject to any disclaimer, the term of this patent is extended or adjusted under 35 U.S.C. 154(b) by 127 days.

(21) Appl. No.: 13/991,757

(22) PCT Filed: Nov. 29, 2011

(86) PCT No.: PCT/EP2011/071238
§ 371 (c)(1),
(2), (4) Date: Jun. 5, 2013

(87) PCT Pub. No.: WO2012/076360
PCT Pub. Date: Jun. 14, 2012

(65) Prior Publication Data
US 2013/0251476 A1    Sep. 26, 2013

(30) Foreign Application Priority Data
Dec. 6, 2010 (DE) .......................... 10 2010 053 412

(51) Int. Cl.
*F16B 31/02* (2006.01)
*F16B 31/00* (2006.01)
*F16B 39/284* (2006.01)

(52) U.S. Cl.
CPC ............... *F16B 31/00* (2013.01); *F16B 31/024* (2013.01); *F16B 39/284* (2013.01)

(58) Field of Classification Search
CPC ..... F16B 39/282; F16B 39/284; F16B 31/024
USPC .............. 411/10, 11, 184–186, 189, 154–156
See application file for complete search history.

(56) References Cited

U.S. PATENT DOCUMENTS

| | | | | |
|---|---|---|---|---|
| 1,037,384 A | * | 9/1912 | White | 411/155 |
| 2,943,528 A | * | 7/1960 | Curry | 411/11 |
| 3,056,443 A | * | 10/1962 | Knocke | 411/186 |
| 3,194,105 A | * | 7/1965 | Gill | 411/10 |
| 3,877,339 A | * | 4/1975 | Muenchinger | 411/372 |
| 4,269,248 A | * | 5/1981 | MacLean et al. | 411/186 |
| 4,293,256 A | * | 10/1981 | Pamer | 411/11 |
| 4,431,353 A | * | 2/1984 | Capuano | 411/11 |
| 4,490,082 A | * | 12/1984 | Barth | 411/185 |

(Continued)

FOREIGN PATENT DOCUMENTS

| | | |
|---|---|---|
| CN | 1625654 A | 6/2005 |
| DE | 2 226 161 | 12/1973 |
| EP | 0 028 746 A1 | 5/1981 |
| EP | 0 104 642 A1 | 4/1984 |

(Continued)

*Primary Examiner* — Flemming Saether
(74) *Attorney, Agent, or Firm* — Birch, Stewart, Kolasch & Birch, LLP

(57) ABSTRACT

The invention relates to a screw having a screw head (2), a screw shank (1) and a corrugated conical flange (4) which decreases in thickness toward the outside, which flange (4) will abut on a component part as the screw is being screwed into the latter. The two lateral surfaces (5, 6) of the flange (4) from the screw shank (1) to the outer edge (7) of the flange taper continuously toward the outside with the thickness of the flange (4) decreasing at the same time, with its corrugation (8) extending substantially over the entire radial width of the flange (4).

16 Claims, 1 Drawing Sheet

(56) References Cited

U.S. PATENT DOCUMENTS 4,498,825 A * 2/1985 Pamer et al. .................. 411/11
5,580,199 A   12/1996 Suzuki
5,782,594 A   7/1998 Muller

FOREIGN PATENT DOCUMENTS

| EP | 0 111 207 A1 | 6/1984 |
| WO | WO 03/076816 A1 | 9/2003 |

* cited by examiner

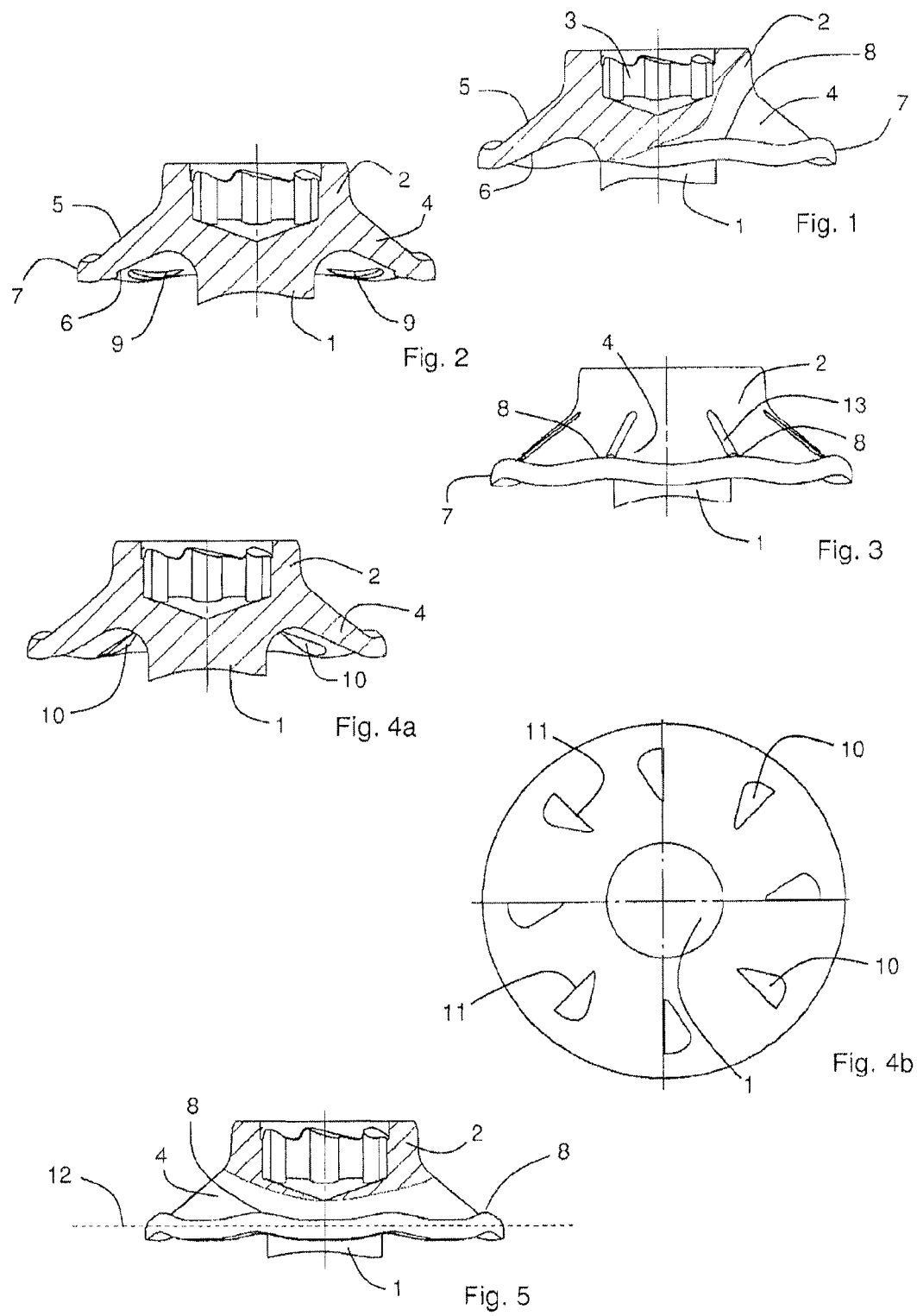

SCREW HAVING A SCREW HEAD, A SCREW SHANK AND A CORRUGATED CONICAL FLANGE

CROSS-REFERENCE TO RELATED APPLICATIONS

The present application claims priority under 35 USC 119 to German Patent Application No. 10 2010 053 412.9 filed Dec. 6, 2010 and PCT Application No. PCT/EP/2011/071238 filed Nov. 29, 2011 the entire contents of which are hereby incorporated by reference.

BACKGROUND OF THE INVENTION

1. Field of the Invention

The invention relates to a screw having a screw head, a screw shank and a corrugated conical flange which decreases in thickness towards its periphery and will abut on a component part as the screw is being screwed into the latter.

2. Description of Background Art

A screw of this kind is illustrated and described in European patent specification 00 28 746 A1. As shown in FIG. 11 of this printed document, the screw described therein having a screw head and a screw shank also includes a flange which will contact the surface of a component part as the screw is being screwed into the latter and will be deformed in this process. The sectional view of FIG. 11 shows the screw in its non-tightened state. This flange has a planar lateral surface facing the component part which bends slightly toward the component part approximately in the middle of the flange so as to form an indentation. As a result, the flange tapers to a certain extent and decreases in thickness from the indentation toward its periphery. As the screw is being screwed into the component part, the outer periphery of the flange will first contact the component part and then be bent back about the indentation until the planar surface of the flange contacts the component part. This will provide feedback to the user that the minimum preload force required for this purpose has been reached. Furthermore, the section of the flange extending from its indentation to its periphery is corrugated, which corrugation will to a certain extent absorb the impact of the flange impinging on the component part. The margin for this cushioning effect by the corrugation is kept rather small since the flange also has a planar surface which extends over its inner half. As a result, this inner planar portion of the flange will contact the component part very shortly after the periphery of the flange has contacted the component part, thus practically preventing any further screwing of the screw into the component part.

SUMMARY AND OBJECTS OF THE INVENTION

It is the object of the invention to substantially increase the margin for this cushioning effect. According to the invention, this is accomplished by having both lateral surfaces of the flange extend in a continuously tapering fashion from the screw shank to the periphery of the flange, with the thickness of the flange decreasing toward its periphery and its corrugation substantially extending over the entire radial width of the flange.

Owing to this specific design of the screw and of its associated flange, two mutually reinforcing measures will result in a respective increase of the margin of the force exerted by the screw, i.e. for one thing the fact that the flange decreases in thickness toward its periphery and furthermore the corrugation of the flange which substantially extends over its entire radial width. As the screw is being tightened, bending of the flange itself on the one hand and returning the corrugation into a more elongated state on the other will thus create a tension over a large area. As a result, even if the conditions prevailing outside a screwed connection including a screw of the invention change substantially, i.e. substantial changes in temperature, the screwed connection involving the screw according to the invention will be able to accommodate such changes and its connection force will thus largely be retained over a wide range as the screw is tightened.

The lateral surfaces of the flange extend over its entire width and in a continuously tapering fashion toward its periphery. From when the periphery of the flange contacts the component part to the substantially flattened state of the flange, a range is thus created for the preload force occurring in this process (i.e. the force of the screw that holds component parts together). This range allows the flange to be increasingly pressed onto the component part due to the fact that the flange tapers over its height. The corrugation which extends over substantially the entire radial width of the flange extends the area to the bending of the flange, thus resulting in an accordingly large margin for setting a desired preload force. The screw according to the invention thus allows its user to optionally set the preload force required between the screw and the component part depending on the desired joining characteristics.

The lateral surface facing the component part may advantageously be provided with contact protrusions which will slow down the tightening of the screw once the screw has contacted the component part. If designed appropriately, the protrusions may be used to function in the manner of locking teeth, making it a lot harder to undo the screw.

The corrugation of the screw is expediently designed such that the highest and lowest position of the corrugation is determined by a periodic function. This allows a particular uniform effect of the screw periphery to be obtained with regard to a counterpart.

As regards the actual corrugation, it has turned out to be particularly expedient to design the function defining the corrugation such that it will be between 0.025 times and 0.5 times the value of the circumference of the flange. Advantageously, the corrugation is assigned a certain maximum value so as not to restrict the effect of the flange. This maximum value of the amplitude of the periodic function is appropriately selected to be between 0.006 times and 0.12 times the value of the flange diameter. It has turned out to be particularly advantageous to have the amplitude of the corrugation decrease continuously from the periphery of the flange toward its center.

It should be noted, however, that the corrugation of the flange can also be of an asymmetrical design.

In order to increase the effect of the flange, the lateral surface of the flange facing away from the component part can advantageously be provided with linear reinforcements that extend radially toward its periphery.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a view of the screw having a screw shank and a screw head, in which part of the head is shown in a sectional view;

FIG. 2 is a sectional view of the screw head only;

FIG. 3 is a view of the screw head with radially extending reinforcements;

FIG. 4a is a sectional view of the screw head with contact protrusions;

FIG. 4b is a view of the screw head as viewed in the direction from the shank to the flange in which the contact protrusions are designed as locking teeth, and FIG. 5 is a lateral view of the screw head in which the corrugation according to a periodic function is more clearly shown.

DETAILED DESCRIPTION OF THE PREFERRED EMBODIMENTS

Shown in FIG. 1 is the screw according to the invention having a screw shank 1 and a screw head 2, with part of the screw head 2 being shown in a sectional view. The screw head 2 is shown to have a cavity 3 which extends towards its interior and constitutes an internal torx that is used to drive an inserted screw. Tapering circularly from the screw head 2 to the exterior is the conical flange 4 whose two lateral surfaces 5 and 6 extend conically in such a manner that the flange 4 continuously decreases in thickness toward its edge 7. The respective cone angle of the lateral surfaces 5 and 6 will be constant and will be maintained over each lateral surface 5 and 6.

As can be seen from FIGS. 1, 3 and 5, the flange 4 is corrugated, with the raised portions of the corrugation extending radially in such a way that the raised portion 8 of the corrugation extends from the edge 7 of the flange 4 to the interior, toward the head 2. Consequently, the corrugation extends completely over the entire width of the flange 4. This allows the flange 4 to practically yield resiliently from its edge 7 to where it transitions into the screw head 2—which is particularly important for the function of the screw for holding two component parts firmly connected at different temperatures.

FIG. 2 is a sectional view of the screw having a screw head 2, a flange 4 and a screw shank 1. As can be seen from this view, the flange 4 has individual protrusions 9 on its bottom lateral surface 6. A plurality of these protrusions is arranged around the shank 1 and protrudes from the bottom lateral surface 6 of said flange 4. When these protrusions 9 contact a component part as the screw is being tightened, they will produce a braking effect which will be noticed by and indicate to the user that the screw has essentially reached its final position in a component part.

FIG. 3 shows a modified design of the screw of FIGS. 1 and 2 in which the lateral surface facing away from the component part has been reinforced by means of linear reinforcements 13. These increase the preload force of the flange 4 which is advantageous for obtaining firm joints.

FIGS. 4a and 4b show protrusions 10 that each have an edge 11 which enables them to function in the manner of locking teeth and prevent the screw from becoming undone by pressing into a counterpart of the screw. In this way, a double effect is obtained by means of these protrusions 10: When they contact a counterpart, they will have a desired braking effect on the screw as it is being tightened and at the same time they will largely prevent the screw from becoming undone. FIG. 4b is a view of the back of the flange 4 of the screw. As can be seen from this view, the flange has a total of eight protrusions 10 which on the one hand have a strong braking effect and on the other hand prevent the screw from becoming undone.

FIG. 5 is a lateral view of the screw, with a broken line 12 having been marked in to more clearly illustrate the corrugation of the flange 4 with its individual raised portions 8. The corrugation here extends in the manner of a periodic function, and both the number and the height of the raised portions can be optionally selected and set during production of the screw depending on what effect the corrugation is to have.

The fact that the screw illustrated in the drawings has a conical flange 4 which extends on either lateral surface 5 and 6 and has a corrugation which extends over a considerable axial portion of the screw lends the screw resilient and flexible characteristics. To be more precise, the screw is capable of bridging a considerable axial area when the flange is bent backwards and its corrugation is compressed, thus maintaining the required clamping force even under special conditions, in particular vast changes of temperature.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A screw comprising:
a screw head (2),
a screw shank (1),
a corrugated conical flange (4) forming a downwardly projecting cone which decreases in thickness towards substantially a peripheral surface of the corrugated conical flange (4),
said corrugated conical flange (4) being adapted to abut on a component part as the screw is being screwed into the latter,
wherein two lateral surfaces (5, 6) of the corrugated conical flange (4) taper continuously from the screw shank (1) to substantially an outer edge (7) of the corrugated conical flange (4) to form the downwardly projecting cone, with the thickness of the corrugated conical flange (4) decreasing toward substantially the peripheral surface, and
corrugation (8) extending over substantially an entire radial width of the corrugated conical flange (4), said corrugations (8) including raised portions extending radially from the outer edge (7) towards the screw head (2).

2. The screw of claim 1, wherein the lateral surface (6) facing the component part is provided with contact protrusions (9) which will act to slow down the tightening of the screw once it has contacted the component part.

3. The screw of claim 2, wherein the contact protrusions are designed in the manner of locking teeth.

4. The screw of claim 3, wherein the highest and the lowest points of the corrugation (8) are determined by a periodic function.

5. The screw of claim 3, wherein the corrugation (8) of the flange (4) is of asymmetrical design.

6. The screw of claim 2, wherein the highest and the lowest points of the corrugation (8) are determined by a periodic function.

7. The screw of claim 2, wherein the corrugation (8) of the flange (4) is of asymmetrical design.

8. The screw of claim 1, wherein the highest and the lowest points of the corrugation (8) are determined by a periodic function.

9. The screw of claim 8, wherein the maximum value of the length of the corrugation based on the periodic function is between 0.025 times and 0.5 times the value of the circumference of the flange.

10. The screw of claim 9, wherein the maximum value of such a periodic function is between 0.006 times and 0.12 times the value of the flange diameter.

11. The screw of claim 9, wherein the amplitude of the corrugation (8) decreases continuously from the outer edge (7) of the flange toward its center.

12. The screw of claim 8, wherein the maximum value of such a periodic function is between 0.006 times and 0.12 times the value of the flange diameter.

13. The screw of claim 12, wherein the amplitude of the corrugation (8) decreases continuously from the outer edge (7) of the flange toward its center.

14. The screw of claim 8, wherein the amplitude of the corrugation (8) decreases continuously from the outer edge (7) of the flange toward its center.

15. The screw of claim 1, wherein the corrugation (8) of the flange (4) is of asymmetrical design.

16. The screw of claim 1, wherein the lateral surface (5) facing away from the component part has linear reinforcements (13) that extend radially to the outside.

* * * * *